United States Patent [19]

Andersson et al.

[11] Patent Number: 4,768,809
[45] Date of Patent: Sep. 6, 1988

[54] SEAT BELT PRE-TENSIONING DEVICE

[75] Inventors: Sture R. Andersson, Nacka; Bengt O. J. S. Morner, Hovas, both of Sweden

[73] Assignee: Autoliv Development AG, Vargarda, Sweden

[21] Appl. No.: 30,417

[22] Filed: Mar. 27, 1987

[30] Foreign Application Priority Data

Apr. 3, 1986 [GB] United Kingdom ............... 8608134

[51] Int. Cl.[4] .................. B60R 22/36; B60R 22/46
[52] U.S. Cl. ................................. 280/806; 297/480
[58] Field of Search ............... 280/801, 806; 297/480

[56] References Cited

U.S. PATENT DOCUMENTS 3,372,777 3/1968 Filippi et al. ..................... 280/806

FOREIGN PATENT DOCUMENTS

| 195268 | 9/1986 | European Pat. Off. | ............ 280/806 |
| 2655491 | 6/1978 | Fed. Rep. of Germany | ...... 297/480 |
| 3304008 | 8/1984 | Fed. Rep. of Germany | . |
| 3327970 | 2/1985 | Fed. Rep. of Germany | . |
| 2382903 | 10/1978 | France | . |
| 2419079 | 10/1979 | France | . |

Primary Examiner—Kenneth R. Rice
Attorney, Agent, or Firm—Spencer & Frank

[57] ABSTRACT

A vehicle seat belt is provided with a device to pre-tension the seat belt should an accident situation arise. Thus, in an accident situation, the person wearing the seat belt is restrained tightly in his seat. The pre-tensioning device includes a force applying means adapted to apply a tension to the seat belt and an over-dead-center linkage which normally prevents the force applying means from applying the force, there being means responsive to a predetermined deceleration to alter the condition of the over-dead-center linkage to permit the force applying means to move the seat belt.

15 Claims, 4 Drawing Sheets

SEAT BELT PRE-TENSIONING DEVICE

This is a continuation of application Ser. No. 683,685, filed 12/19/84.

BACKGROUND OF THE INVENTION

This invention relates to a seat belt pre-tensioning device, and more particularly to a seat belt pre-tensioning device adapted to tension a seat belt when an accident occurs.

When an accident occurs involving a motor car it is not unusual for the motor car to be decelerated very rapidly, and in some cases the car can be considered to stop virtually instantaneously. When this happens the occupants of the car, who have their own momentum which is related to the speed of the car before the accident, do not stop immediately, but tend to continue to travel forwardly. It is to arrest this forward movement, and to prevent the occupants of the car from colliding with parts of the car that are not stationary, such as the steering wheel, that seat belts are worn.

It is known for seat belts fitted with inertia reels to be worn. The inertia reel tends to reel up any slack in the seat belt when it has been positioned to restrain the occupant of the car, but is designed to "lock" when subjected to a deceleration in excess of a predetermined deceleration. The inertia reel is thus prevented from rotating to pay out the seat belt.

If a car fitted with such inertia seat belts is involved in an accident, when the car is decelerated rapidly the occupants of the car will still tend to move forwards as a consequence of their own personal momentum. During a brief initial time period the seat belt, which is relatively loosely stretched across the occupant of the car, is placed under tension as the occupant moves forwardly relative to the seat. The tension in the belt is applied to the reel of the inertia reel device (which is now "locked") and an extra length of belt is paid out from the reel as the part of the belt that is wound on the reel is tightened. Thus the occupant of the car still moves forwardly. This can occupy the 35 milli-seconds or so after the instant of impact and during this period of time the occupant may move a significant part of the way from the seat towards the steering wheel or dash board. Thus, if the occupant is to be arrested before impact with the steering wheel or dashboard very high retarding forces must be applied to the occupant. These retarding forces must be applied to the occupant of the car in a very short period of time, and thus the retarding forces must be very large if the occupant of the car is to be prevented from impacting with the steering wheel or dashboard. These large forces may thus injur the occupant of the car.

It has been realised that the risk of injuring the occupant of a car with the seat belt if an accident occurs can be reduced if the seat belt arrangement is such that the occupant of the car can be decelerated as soon as possible after the accident occurs. This can be achieved if the occupant is always strapped in tightly, with the seat belt under significant tension at all times. However, it is not practicable to adopt this technique if inertia reels are utilised.

OBJECT OF THE INVENTION

The present invention seeks to provide an apparatus in which, when a deceleration in excess of a predetermined deceleration is determined, a positive tension is applied to the seat belt so that the seat belt is fully tightened before the occupant of the car moves forwardly relative to the seat by a significant extent.

BRIEF SUMMARY OF THE INVENTION

According to this invention there is provided a vehicle seat belt pretensioning apparatus comprising means to mount the apparatus in the vehicle, means on the apparatus to receive part of a seat belt, means adapted to apply a force to move said seat belt receiving means to apply a tension to the seat belt and means comprising an over-dead-centre linkage which normally prevent the force applying means from moving the seat belt receiving means, the apparatus including means responsive to a predetermined deceleration to alter the condition of the over-dead-centre linkage to permit the force applying means to move the seat belt receiving means.

Preferably the seat belt receiving means is connected to a drive element, said force applying means applying a force to the drive element tending to move the drive element, the drive element being connected to said over-dead-centre linkage, part of the over-dead-centre linkage being retained in position by a stop, said deceleration responsive means causing part of the apparatus to move thus altering the condition of the over-dead-center linkage so that the force applying means may then move the drive element, the drive element thus also moving the seat belt receiving means.

Conveniently said force applying means comprises a torsion bar.

Preferably the torsion bar comprises the deceleration responsive means, the torsion bar being arranged to extend transversely of the vehicle, at least one end of the torsion bar being movable in the axial direction of the vehicle, said end of the torsion bar being connected to said drive element so that a predetermined movement of said one end of the torsion bar moves said drive element by a predetermined distance, thus altering the condition of the over-dead-centre linkage such that the drive element may be moved rotationally by the torsion bar, thus moving the seat belt receiving means.

Advantageously said drive arm has an axial slot formed therein which receives a transverse pin, said transverse pin being guided in an arcuate guide slot upon movement of said drive arm in response to the force applied thereto by the torsion bar, said pin being connected to the seat belt receiving means.

Preferably the drive element is supported in a substantially friction-free way to enable said end of the torsion bar to move substantially freely in response to an applied deceleration.

Conveniently the said end of the torsion bar is supported by means of a support arm, one end of the support arm being mounted in a substantially frictionless way by means of a support presenting an upper pointed apex engaging in an aperture formed in the support arm.

Preferably the other end of the support arm is connected to the torsion bar in a substantially frictionless way.

Preferably means are provided adapted to restrain the drive arm in a predetermined position until a predetermined deceleration is exceeded.

Conveniently said means adapted to retain the drive arm in position comprise magnetic means or spring means applying a bias to said drive arm or to the free end of the torsion bar, this bias having to be overcome before the drive arm can move forwardly.

Advantageously the arrangement of the over-dead-centre linkage is such that the drive element must move forwardly by a predetermined amount before the drive element may move rotationally to apply the said force to the seat belt retaining means.

In preferred embodiments the means which alter the condition of the over-dead-centre linkage comprise on inertia mass, movement of the inertia mass causing the condition of the over-dead-centre linkage to be altered.

In one embodiment the mass is associated with means which, on movement of the mass, engage the over-dead-centre linkage to alter the condition of the linkage.

In an alternative embodiment the mass is directly connected to the over-dead-centre linkage.

Preferably the mass is retained in position by frangible means which break when the mass is subjected to a predetermined deceleration.

BRIEF INTRODUCTION OF THE DRAWINGS

DESCRIPTION OF PREFERRED EMBODIMENTS

Figure 1:
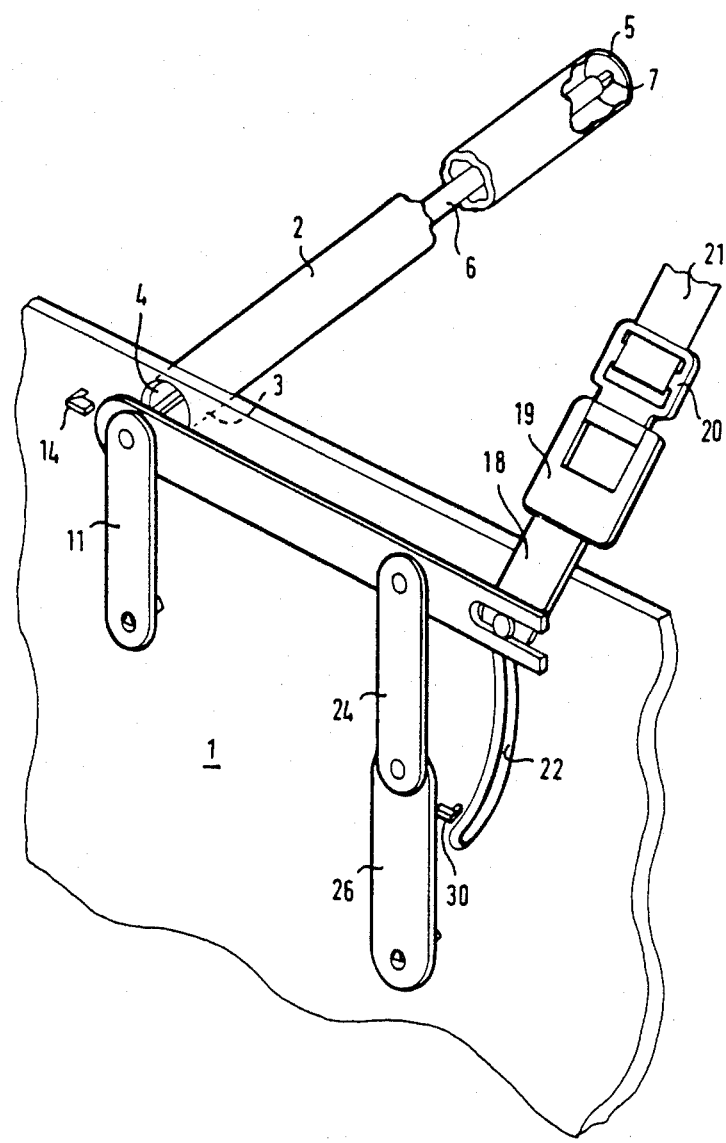
FIG. 1 is a perspective view of the most important components of one example of an arrangement in accordance with the invention.

The embodiment of the invention which is now to be described consists of several moving elements which are mounted in position on pivots and which engage fixed straps. In a practical embodiment of the invention the various components would be mounted on the frame of a seat in the motor vehicle. However, for the sake of simplifying the description, and thus facilitating a clear understanding of the principles of the invention, the invention will be described with reference to an embodiment in which the various movable components are mounted on a support plate 1.

Referring now to the drawings a main support plate 1 is provided which can be fixed in position adjacent the side of a seat (not shown) mounted in a motor vehicle. The plate 1 is mounted in a vertical orientation in a vertical plane aligned with the axis of the car. The plate may be mounted in position by any appropriate means.

A tubular housing 2 (which may constitute part of the seat frame) is mounted on one side of the plate 1, the tubular housing 2 having an open end 3 which is secured to one side of the plate in alignment with an aperture 4 formed in the plate. The housing 2 extends horizontally substantially transversely to the axis of the motor car. The tubular housing 2 is closed by an end plate 5 located at the end of the housing remote from the plate 1. The end plate 5 may be connected to any suitable support (not shown).

An elongate torsion bar 6 is mounted in the tubular housing. At a first end the torsion bar 6 has a square cross sectioned projecting peg 7 which is retained in a correspondingly shaped aperture formed in the end plate 5 of the housing 2. The torsion bar 6 extends axially through the tubular housing 2 and projects through the aperture 4 formed in the plate 1. The projecting portion of the torsion bar comprises a square sectioned peg which is received in a correspondingly shaped square aperture 7' formed in a drive arm 8.

A cylindrical projection 9 extends axially from the square sectioned peg received in the aperture 7', and the cylindrical projection 9 is received in a circular aperture 10 formed in a supporting lever 11. If it is desired to provide low friction engagement between the torsion bar and the lever, the end of the torsion bar may have a triangular shaped projection one apex of which engages the inner edge of a round aperture formed in the lever 11. The supporting lever 11 is in a substantially vertical position. At the lower end of the support lever 11 there is a circular aperture 12 in which is located a triangular bearing pin 13 which projects substantially horizontally from the plate 1. An apex of the triangular pin supportingly engages the aperture 12. Thus the lever 11 is pivotally supported at its lower end in a virtually frictionless manner, and when in the illustrated vertical position provides support for the projection 9, thus providing support for the end of the torsion bar 6 extending through the aperture 4.

Figure 2:
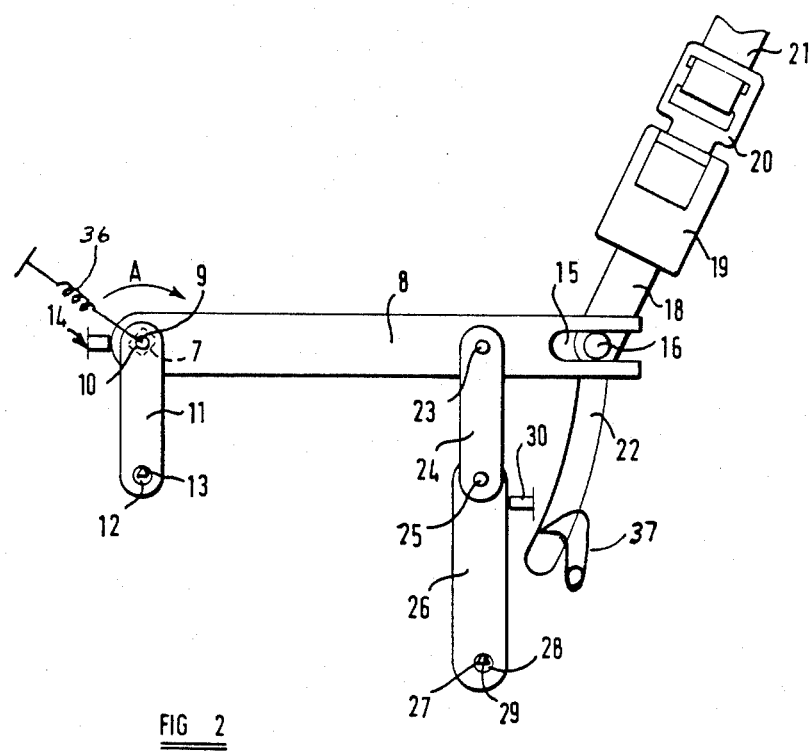
FIG. 2 is a side elevational view of the arrangement shown in FIG. 1.

A stop 14 is provided, fixed in some convenient way to the plate 1, which abuts the left-hand end of the drive arm 8 (as illustrated), thus preventing the drive arm 8 from moving in a leftward direction from the position illustrated in FIGS. 1 and 2.

The drive arm 8 is shown, in FIGS. 1 and 2, in a substantially horizontal condition. At the right hand end of the drive arm 8 there is formed an axially extending slot 15 which receives a transverse pin 16. The pin 16 is connected to a steel strap 18 extending from a buckle 19 adapted to receive a tongue 20 to which is connected a safety belt 21. The strap 18, the buckle 19, the tongue 20 and the seat belt 21 may be of a conventional design. The transverse pin 16 also extends into an arcuate guide slot 22 formed in the plate 1. The centre of curvature of the arcuate guide slot 22 is substantially coincident with the longitudinal axis of the torsion bar 6. The apparatus is illustrated, in FIGS. 1 and 2, with the transverse pin 16 located substantially at the uppermost end of the arcuate guide slot 22.

The drive arm 8 is pivotally connected, by means of a pivot pin 23, to an over-dead centre linkage comprising a first lever 24 which is pivotally connected by means of a pivot 25 to a second lever 26 which in turn is pivotally mounted by means of a substantially friction free bearing 27 on the plate 1. The bearing 27 may comprise an aperture 28 formed in the lower end of the lever 26, resting on the apex of a triangular support 29 projecting from the plate 1. A stop 30 is provided, again mounted on the plate in some convenient way which engages the right hand side of the lever 26 adjacent the pivotal connection 25.

Figure 3:
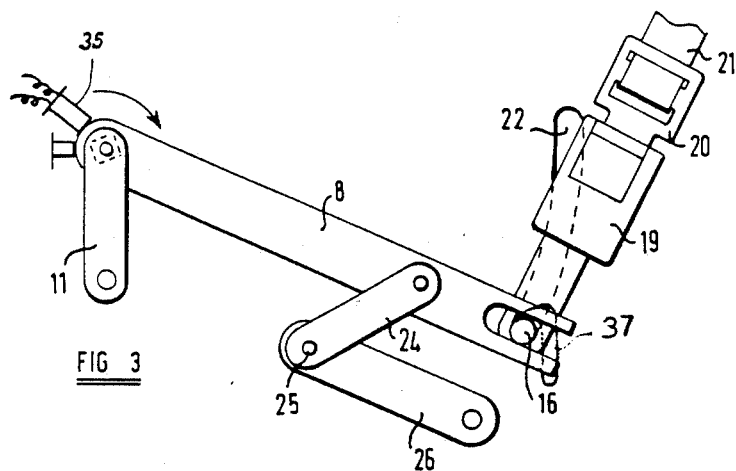
FIG. 3 is a view corresponding to FIG. 2 showing parts thereof in an alternative condition after a deceleration in excess of a predetermined deceleration has occurred.

The torsion bar 6 is provided to apply a rotational force to the drive arm 8 in the direction indicated by the arrow A in FIG. 2. The torsion bar 6 also, however, provides an "inertia" effect and it will be appreciated that when the vehicle in which the described arrangement is mounted decelerates, the end of the torsion bar 6 projecting through the aperture 4 will tend to move forwardly (i.e. towards the right as illustrated) due to the inertia of the torsion bar. Means may be provided to retain the end of the torsion bar projecting through the aperture 4 in its initial position until a predetermined deceleration occurs. These means may comprise magnetic means 35, as shown in FIG. 3, for applying a force to the end of the torsion bar tending to retain the torsion bar in position with the left hand end of the drive arm 8 in engagement with the stop 14, or may comprise a spring 36, as shown in FIG. 2, providing a similar effect.

As will be appreciated, the described apparatus will normally be in the condition illustrated in FIGS. 1 and 2. It will be observed that although the torsion bar is applying a force tending to rotate the drive arm in the direction illustrated by the arrow A, the drive arm 8 cannot actually rotate in this direction. The reason for this is that the over-dead-centre linkage constituted by the levers 24, 26 is in such a position that the pivot points of these levers, 23, 25 and 27 are all arranged substantially on a single straight line, but the pivot 23 is located slightly to the left of a line defined by the pivots 25 and 27. Thus the force tending to rotate the drive arm 8 in the direction of the arrow A applies a downward force to the combined levers 24, 26 which tends to move the pivot point 25 towards the right. However, the pivot point 25 cannot move to the right because of the presence of the stop 30.

When a motor vehicle in which the described device is mounted is subjected to a rapid deceleration, in excess of a predetermined deceleration, the end of the torsion bar projecting through the aperture 4 will tend to move to the right as shown in FIG. 2. Assuming the decelerational force is sufficient, the torsion bar will move to the right overcoming any bias applied to the torsion bar by the above-mentioned spring or magnetic means. As the free end of the torsion bar moves towards the right, so the drive arm 8 will also move towards the right. The part of the drive arm 8 defining the elongate slot 15 will thus move to the right relative to the transverse pin 16, and also the pivot point 23 will move to the right and will then be located towards the right of the line defined by the pivot points 27 and 25. Thus the operative condition of the over-dead-centre linkage is altered, and the over-dead-centre linkage no longer prevents rotation of the drive arm 8. As soon as the pivot point 23 crosses the line defined by the pivot points 27 and 25 the rotational force applied to the drive arm 8 by the torsion bar 6, tending to rotate the drive arm 8 in the direction of the arrow A, will tend to cause the over-dead-centre linkage to move in such a direction that the pivot point 25 moves towards the left. There is no stop provided to prevent this movement, and thus the pivot point 25 does move towards the left enabling the drive arm 8 to move in a clockwise direction as indicated by the arrow 30. The movement of the drive arm 8 causes the pin 16 to move along the arcuate guide slot 22 formed in the plate 1, moving the buckle 19 and the tongue 20 downwardly, and applying tension to the safety belt strap 21. Thus, as soon as a deceleration in excess of a predetermined deceleration is detected, the described apparatus will be actuated, and a pre-tension will be applied to the safety belt 21, retaining the person wearing the safety belt securely in position in their seat.

It will be observed that the arm 11 effectively supports the free end of the torsion bar in such a way that the free end of the torsion bar is able to move forwardly, when the predetermined deceleration is exceeded, in a virtually frictionless manner. The free end of the torsion bar could be mounted in position on a roller bearing or the like, but it has been found that such a roller bearing may have a tendency to "stick" particularly if the roller bearing is not operated regularly. Of course it is to be understood that the presently described apparatus is intended to function only in an accident situation since, of course, after the apparatus has been actuated it is necessary to re-set the apparatus before the apparatus is ready for re-use. It is thus envisaged that the predetermined deceleration mentioned above will be selected so that the apparatus will only function during a real accident situation and not under any ordinary driving circumstances. The described arrangement therefore provides a support for the free end of the torsion bar which possesses satisfactory characteristics. However, it is envisaged that the end of the torsion bar may be supported in various other ways that would be satisfactory.

It is envisaged that it will be desirable to provide a mechanism such as a catch 37 engagable with the strap 18 or the pin 16 when the drive arm 8 has moved to the position illustrated in FIG. 3 to retain the buckle 19 in the lower position, since, of course, the buckle 19 will then be subjected to a significant force tending to move the drive buckle 19 upwardly as the seat belt retains the passenger in his seat during the accident. The mechanism may be of any appropriate design, but must perform the function of retaining the buckle 19 in the lower position.

Figure 4:
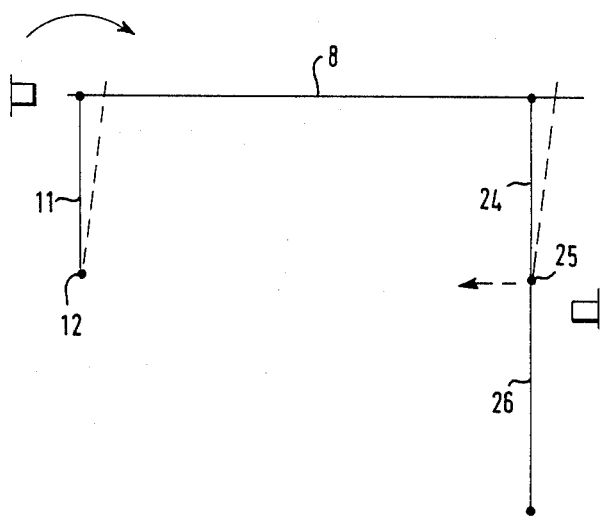
FIG. 4 is a diagrammatic view for purposes of explanation.

FIG. 4 is a diagrammatic view of the apparatus described above with reference to FIGS. 1 to 3. The figure illustrates the initial positon of the various components in a solid line and shows, in a dotted line, the position of the arms 11 and 24 after the drive arm 8 has moved slightly towards the right. It can thus be understood how the pivot point 25 is then able to move towards the left to enable the drive arm 8 to executed the necessary rotary movement.

Figure 5:
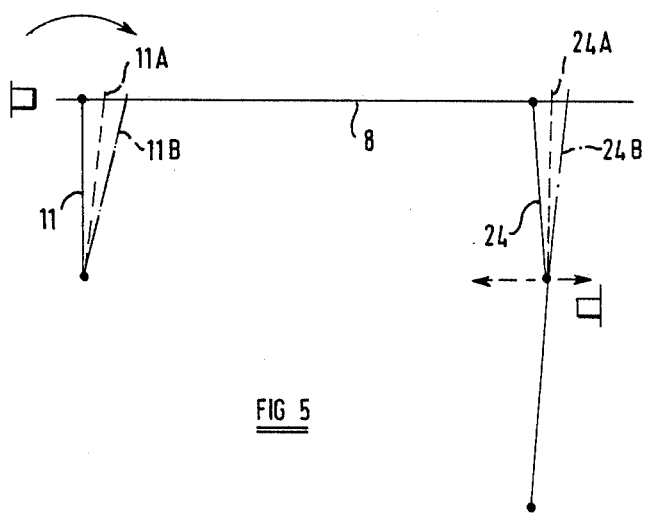
FIG. 5 is an alternative diagrammatic view for purposes of explanation.

It is to be appreciated, from FIG. 5, that in an alternative arrangement the upper arm 24 of the over dead centre linkage may lean significantly towards the left and may thus not be parallel with the support arm 11. It will be understood that in utilising such a configuration for the components of the invention as an initial condition, the drive arm 8 must move towards the right by a significant extent before the condition of the over-dead-centre linkage will be altered to permit the drive arm 8 to rotate. Thus the drive arm 8 must move past the position in which the arms 11 and 24 occupy the position indicated by the lines 11a, 24a and must pass to the position in which these components occupy the position indicated by the lines 11b and 24b before the drive arm 8 will be rotated. Thus, if the components of the over-dead-centre linkage have such an initial condition it may be possible to omit the above-mentioned magnetic or spring retaining means since the free end of the torsion bar emerging through the aperture 4 must execute a significant movement towards the right before the mechanism will be actuated, and the free end of the torsion bar will only execute such a significant movement to the right if subjected to severe deceleration.

It is to be understood that the described embodiment of the invention is only one relatively simple embodiment of the invention. The various components have been described as being mounted in position on a single support plate 1, the components will, in a commercial practicable embodiment of the invention be mounted on the seat in such a way that the components are held securely in position relative to one another so as to execute the described operational function.

While one arrangement that alters the condition of the over-dead-centre linkage has been described above, various other arrangements may be provided.

Figure 6:
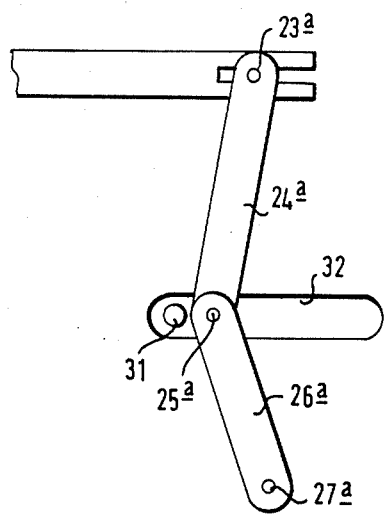
FIG. 6 is a partial side view showing a further embodiment of the invention.

In FIG. 6 the over-dead-centre linkage is arranged so that in the initial position, as illustrated, the pivot 23a is to the right of the line defined by the lower points 25a and 27a. A stop 31 is provided which is located to the left of the lever 26a. However, the stop 31 consists of a peg 31 which can slide along a slot 32 formed in the plate 1. The peg 31 is connected to an inertia mass (which may comprise the seat) which is retained, relative to the car, by a frangible pin (not shown). When a deceleration greater than a predetermined deceleration is detected the frangible pin will break, and the inertia mass will move forwardly, thus moving the peg 31 forwardly along the slot 32. Thus the peg will move the pivot point 25a to the right, and when the pivot point 23a is located to the left of the line defined by the pivot points 25a and 27a the condition of the over-dead-centre linkage will be altered, and the levers of the linkage will pivot to let the drive arm rotate.

Figure 7:
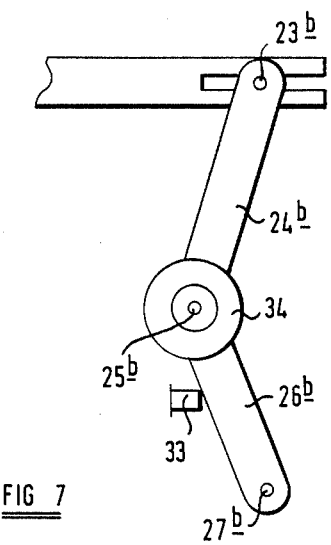
FIG. 7 is another partial side view showing another embodiment of the invention.

In the arrangement shown in FIG. 7 the levers 24b and 26b have the same relative initial position as the levers 24a and 26a in FIG. 6. The lever 26b has a stop 33, mounted directly on the plate 1, engaging its left hand side. An inertia mass 34 is mounted on the pivot point 25b. When the car decelerates the inertia mass 34 will tend to move to the right, thus pushing the slotted end of the drive arm 8 upwardly against the rotational bias applied by the torsion bar. If the deceleration exceeds a predetermined level the mass 34 will move to the right to such an extent that the pivot 23b will lie to the left of the line defined by the pivots 25b and 27b, and the condition of the over-dead-centre linkage will thus be altered, and the levers of the linkage will pivot to let the drive arm rotate.

Many modifications may be made to the presently described embodiments of the invention.

What is claimed is:

1. A vehicle seat belt pre-tensioning apparatus comprising; means to mount the apparatus in the vehicle, receiving means for receiving part of a seat belt, means adapted to apply a force to move said seat belt receiving means to apply tension to the seat belt, means comprising an over-dead-centre linkage which normally prevents the force applying means from moving the seat belt receiving means, means responsive to a predetermined deceleration to alter the condition of the over-dead-centre linkage to permit the force applying means to move the seat belt receiving means, said seat belt receiving means is connected to a drive element, said force applying means applying a force to the drive element tending to move the drive element, the drive element being connected to said over-dead-centre linkage, part of the over-dead-centre linkage being retained in position by a stop, wherein said force applying means, and said deceleration responsive means, comprise a torsion bar, the torsion bar being arranged to extend transversely of the vehicle, at least one end of the torsion bar being movable in the axial direction of the vehicle, said end of the torsion bar being connected to said drive element so that a predetermined movement of said one end of the torsion bar moves said drive element by a predetermined distance, thus altering the condition of the over-dead-centre linkage such that the drive element may be moved rotationally by the torsion bar, thus moving the seat belt receiving means.

2. An apparatus according to claim 1 wherein said drive arm has an axial slot formed therein which receives a transverse pin, said transverse pin being guided in a guide slot upon movement of said drive arm in response to the force applied thereto by the torsion bar, said pin being connected to the seat belt receiving means.

3. An apparatus according to claim 1, wherein the end of the torsion bar connected to the drive element is supported in a substantially friction-free way to enable said end of the torsion bar to move substantially freely in response to an applied deceleration.

4. An apparatus according to claim 3 wherein the said end of the torsion bar is supported by means of a support arm, one end of the support arm being mounted in a substantially frictionless way by means of a support presenting an upper pointed apex engaging in an aperture formed in the support arm.

5. An apparatus according to claim 4 wherein the other end of the support arm is connected to the torsion bar in a substantially frictionless way.

6. An apparatus according to claim 1, wherein means are provided adapted to restrain the drive arm in a predetermined position until a predetermined deceleration is exceeded.

7. An apparatus according to claim 6 wherein said means adapted to retain the drive arm in position comprise magnetic means applying a bias to said drive arm said bias having to be overcome before the drive arm can move forwardly.

8. An apparatus according to claim 6, wherein said means adapted to retain the drive arm in position comprises a spring means applying a bias to said drive arm, said bias having to be overcome before the drive arm can move forwardly.

9. An apparatus according to claim 6 wherein said means adapted to retain the drive arm in position comprise magnetic means applying a bias to the free end of the torsion bar, said bias having to be overcome before the drive arm can move forwardly.

10. An apparatus according to claim 6, wherein said means adapted to retain the drive arm in position comprises a spring means applying a bias to the free end of the torsion bar, said bias having to be overcome before the drive arm can move forwardly.

11. An apparatus according to claim 1, wherein the arrangement of the over-dead-centre linkage is such that the drive element must move forwardly by a predetermined amount before the drive element may move rotationally to apply the said force to the seat belt retaining means.

12. An apparatus according to claim 1, wherein in a catch is provided adapted to retain the seat belt in the position to which it is moved by the force applying means.

13. A vehicle seat belt pre-tensioning apparatus comprising; means to mount the apparatus in the vehicle, receiving means for receiving part of a seat belt, means adapted to apply a force to move said seat belt receiving means to apply tension to the seat belt, means comprising an over-dead-centre linkage which normally prevents the force applying means from moving the seat belt receiving means, an inertia mass responsive to a predetermined deceleration of the vehicle to alter the condition of the over-dead-centre linkage to permit the force applying means to move the seat belt to a pre-tensioned position, wherein said inertia mass is retained in position by a frangible means which breaks and releases the inertia mass when said inertia mass is subjected to said predetermined deceleration.

14. An apparatus according to claim 13 wherein the inertia mass is associated with means which, on movement of the mass, engage the inertia over-dead-centre linkage to alter the condition of the linkage.

15. An apparatus according to claim 13 wherein the inertia mass is directly connected to the over-dead-centre linkage.

* * * * *